United States Patent [19]

Imanaka

[11] Patent Number: 5,715,922
[45] Date of Patent: Feb. 10, 1998

[54] FRICTION GENERATING MECHANISM FOR A DAMPER DISC ASSEMBLY

[75] Inventor: Hideyuki Imanaka, Moriguchi, Japan

[73] Assignee: Exedy Corporation, Osaka, Japan

[21] Appl. No.: 678,030

[22] Filed: Jul. 10, 1996

[30] Foreign Application Priority Data

Jul. 24, 1995  [JP]  Japan .................... 7-187038

[51] Int. Cl.$^6$ .................... F16D 3/66
[52] U.S. Cl. .................... 192/213.22; 192/213.31; 464/68
[58] Field of Search .................... 192/213.22, 213.31, 192/213.12, 213.21, 202, 204; 464/68

[56] References Cited

U.S. PATENT DOCUMENTS

| | | | |
|---|---|---|---|
| 4,274,525 | 6/1981 | Raab et al. ................ | 192/213.31 |
| 4,634,398 | 1/1987 | Alas ........................ | 192/213.22 X |
| 4,640,402 | 2/1987 | Hartig et al. .............. | 192/202 |
| 4,655,336 | 4/1987 | Casper et al. ............. | 192/202 |
| 4,690,660 | 9/1987 | Hashimoto ................. | 192/213.21 X |
| 4,887,485 | 12/1989 | Kobayashi et al. ......... | 464/68 X |
| 4,991,704 | 2/1991 | Flotow ...................... | 192/202 |
| 4,993,530 | 2/1991 | Maki ......................... | 192/213.22 |
| 5,374,218 | 12/1994 | Reik et al. ................. | 192/213.21 X |
| 5,634,543 | 6/1997 | Hashimoto et al. ........ | 192/213.21 |

FOREIGN PATENT DOCUMENTS

| | | |
|---|---|---|
| 43 32 936 A1 | 4/1994 | Germany. |
| 195 24 749 C1 | 7/1996 | Germany. |
| 2303196 | 2/1997 | United Kingdom. |

Primary Examiner—Rodney H. Bonck
Attorney, Agent, or Firm—Shinjyu Office of Patent Attorney Osaka, Japan

[57] ABSTRACT

To smooth the response characteristics at a transition point between a first stage and second stage of friction mechanism in a damper disc assembly, the damper disc assembly includes several friction generating mechanisms. One friction generating mechanism 9 includes, a flange 2b, a retaining plate 4, a friction washer 18 and a conical spring 19. A flange 2b has projections 2f projecting toward the retaining plate 4 and extending through a predetermined angle in a circumferential direction. The friction washer 18 is formed with two distinct friction surfaces, disc portion 18a and high frictional coefficient member 18c. The disc portion 18a has a low frictional coefficient and is in contact projections 2f formed on a hub 2 when there is no torsion applied to the damper disc. The high frictional coefficient member 18c is formed at spaced apart intervals on the friction washer 18 and are engagable with the projections 2f in response to torsional vibrations being applied to the damper disc. The second friction washer 18 is coupled with the retaining plate 4 in the circumferential direction. The second conical spring 19 is used to bias the second friction washer 18 toward the flange 2b.

19 Claims, 5 Drawing Sheets

FRICTION GENERATING MECHANISM FOR A DAMPER DISC ASSEMBLY

BACKGROUND OF THE INVENTION

1. Field of the Invention

The present invention relates to a friction generating mechanism, and more particularly to a friction generating mechanism for dampening vibrations during torque transmission.

2. Description of the Related Art

A clutch disc assembly used in an automotive clutch applications typically includes a damper disc assembly for absorbing vibrations during torque transmission. The clutch disc assembly and damper disc assembly typically includes a pair of input plates, an output hub formed with a radially extending flange on its outer circumference, and coil springs for elastically coupling the input plates and the hub in the circumferential direction.

As well, the hub may be formed of a plurality of separate members. For instance, the hub and flange may be separate members where the flange is configured to undergo limited relative rotary displacement with respect to the hub. The hub and flange are coupled together in the circumferential direction by low rigidity coil springs. In this configuration, a relative twist angle between the input plates and the hub is further increased by the inclusion of a separate flange, and provides two-stage twist vibration dampening characteristics, the two-stages including a high and low rigidity responses. In order to insure smooth vibration dampening, friction has been used to obtain a hysterisis torque response where a first friction generating mechanism is interposed between the input plates and the hub and a second friction generating mechanism is interposed between the separate flange and the input plates. When vibrations having a small twist angle are transmitted, a relative rotation is generated between the input plates/separate flange and the output hub. At this time, the low rigidity coil springs are compressed, and a small friction is generated by the first friction generating mechanism. Furthermore, when vibrations having a large twist angle are transmitted, a relative rotation is generated between the input plates and the separate flange/output plate. At this time, the high rigidity coil springs are compressed between the input plates and the separate flange, and a large friction is generated between the input plates and the separate flange by the second friction generating mechanism. As described above, each type of vibration may be effectively dampened by the low rigidity/small friction characteristics for the minute twist vibration and by the high rigidity/large friction characteristics for the large twist vibration.

In the above-described clutch disc assembly, in order to dampen the low level or small vibrations which sometimes occur when the engine is idling or the like, it is necessary to set the rigidity of the elastic members functioning in the first stage at a low level. On the other hand, in order to dampen the vibration of the large twist like a low frequency vibration, it is necessary to set the rigidity of the elastic members functioning in the second stage at a high level. For this reason, in the conventional assembly, the twist characteristics are abruptly changed upon the transmission of the twist characteristics from the first stage to the second stage. If the twist vibrations in the range including this change point are transmitted, there are shocks that causes abnormal sounds that the two-stage configuration is unable to dampen.

SUMMARY OF THE INVENTION

One object of the present invention is to smooth the response change between the first stage and the second stage of a two stage friction generating dampening assembly.

In one aspect of the present invention, a friction generating mechanism for a damper disc assembly includes a first rotary member and a second rotary member disposed adjacent to the first rotary member, the second rotary member being rotatable relative to the first rotary member. The second rotary member is formed with at least one arcuate projection extending toward the first rotary member, the arcuate projection extending a predetermined angle in a circumferential direction on the second rotary member. An annular friction member is disposed between the first and second rotary members, the annular friction member being coupled to the first rotary member in the circumferential direction for rotation therewith, the annular friction member formed with a first friction surface which contacts the projections with the first and second rotary members in a torsion free state. The annular friction member is also formed with a second friction surface disposed on the second rotary member extending a predetermined angle in a circumferential direction on the second rotary member. The second friction surface is engagable with the projections in response to torsion vibration being applied to the first and second rotary members, the second friction surface having a frictional coefficient higher than the first friction surface. Further, biasing members for biasing the annular friction member toward the second rotary member are disposed between the annular friction member and the second rotary member.

Preferably, two of the first friction surfaces are formed on a single side of the annular friction member and two of the projections are formed on the second rotary member.

Preferably, the second friction surface is formed on a surface of the annular friction member and is formed from fiberglass and resin materials.

Preferably, a plurality of first friction surfaces are formed on the annular friction member and a plurality of second friction surfaces are formed on the second rotary member, the first friction surfaces and the projections are alternately arranged in the circumferential direction.

Preferably, a leading edge of each end of the second friction surface gradually narrows proximate the first friction surface.

Preferably, the friction generating mechanism further includes a sub-plate disposed concentrically and radially outward from the second rotary member, the sub-plate and the second rotary member elastically coupled together by at least one spring member restricting the sub-plate and the second rotary member to limited relative rotary displacement.

Preferably, the friction generating mechanism further includes a second annular friction member disposed between the first rotary member and the sub-plate at a position radially outward from the first annular friction member.

Preferably, the friction generating mechanism further includes a third rotary member disposed adjacent to the second rotary member such that the first and third rotary members are on opposite sides of the second rotary member and opposite sides of the sub-plate, and a third annular friction member disposed between the sub-plate and the third rotary member.

Preferably, the friction generating mechanism further includes a clutch disc friction member connected to the third rotary member.

Preferably, the friction generating mechanism further includes at least one coil spring elastically coupling the sub-plate and the first and third rotary members together restricting the sub-plate to limited relative rotary displacement with respect to the first and third rotary members.

In another aspect of the present invention, a friction generating mechanism for a damper disc assembly includes a first rotary member and a second rotary member disposed adjacent to the first rotary member being rotatable relative to the first rotary member, the second rotary member having at least one arcuate projection extending toward the first rotary member. The arcuate projection extends a predetermined angle in a circumferential direction on the second rotary member. The second rotary member includes a central aperture formed with spline gears. An annular friction member is disposed between the first and second rotary members, the annular friction member being coupled to the first rotary member in the circumferential direction for rotation therewith. The annular friction member is formed with a first friction surface which contacts the projections with the first and second rotary members in a torsion free state. The annular friction member is also formed with a second friction surface disposed on the second rotary member extending a predetermined angle in a circumferential direction on the second rotary member. The second friction surface being engagable with the projections in response to torsion vibration being applied to the first and second rotary members, the second friction surface having a frictional coefficient higher than the first friction surface. Further, biasing members for biasing the annular friction member toward the second rotary member are disposed between the annular friction member and the second rotary member. A sub-plate is disposed concentrically and radially outward from the second rotary member, the sub-plate and the second rotary member elastically coupled together by at least one spring member restricting the sub-plate and the second rotary member to limited relative rotary displacement.

Preferably, two of the first friction surfaces are formed on a single side of the annular friction member and two of the projections are formed on the second rotary member.

Preferably, the second friction surface is formed on a surface of the annular friction member and is formed from fiberglass and resin materials.

Preferably, a plurality of first friction surfaces are formed on the annular friction member and a plurality of second friction surfaces are formed on the second rotary member, the first friction surfaces and the projections are alternately arranged in the circumferential direction.

Preferably, a leading edge of each end of the second friction surface gradually narrows proximate the first friction surface.

Preferably, the friction generating mechanism further includes a second annular friction member disposed between the first rotary member and the sub-plate at a position radially outward from the first annular friction member.

Preferably, the friction generating mechanism further includes a third rotary member disposed adjacent to the second rotary member such that the first and third rotary members are on opposite sides of the second rotary member and opposite sides of the sub-plate, and a third annular friction member disposed between the sub-plate and the third rotary member.

Preferably, the friction generating mechanism further includes a clutch disc friction member connected to the third rotary member.

Preferably, the friction generating mechanism further includes at least one coil spring elastically coupling the sub-plate and the first and third rotary members together restricting the sub-plate to limited relative rotary displacement with respect to the first and third rotary members.

DESCRIPTION OF THE PREFERRED EMBODIMENTS

Figure 1:
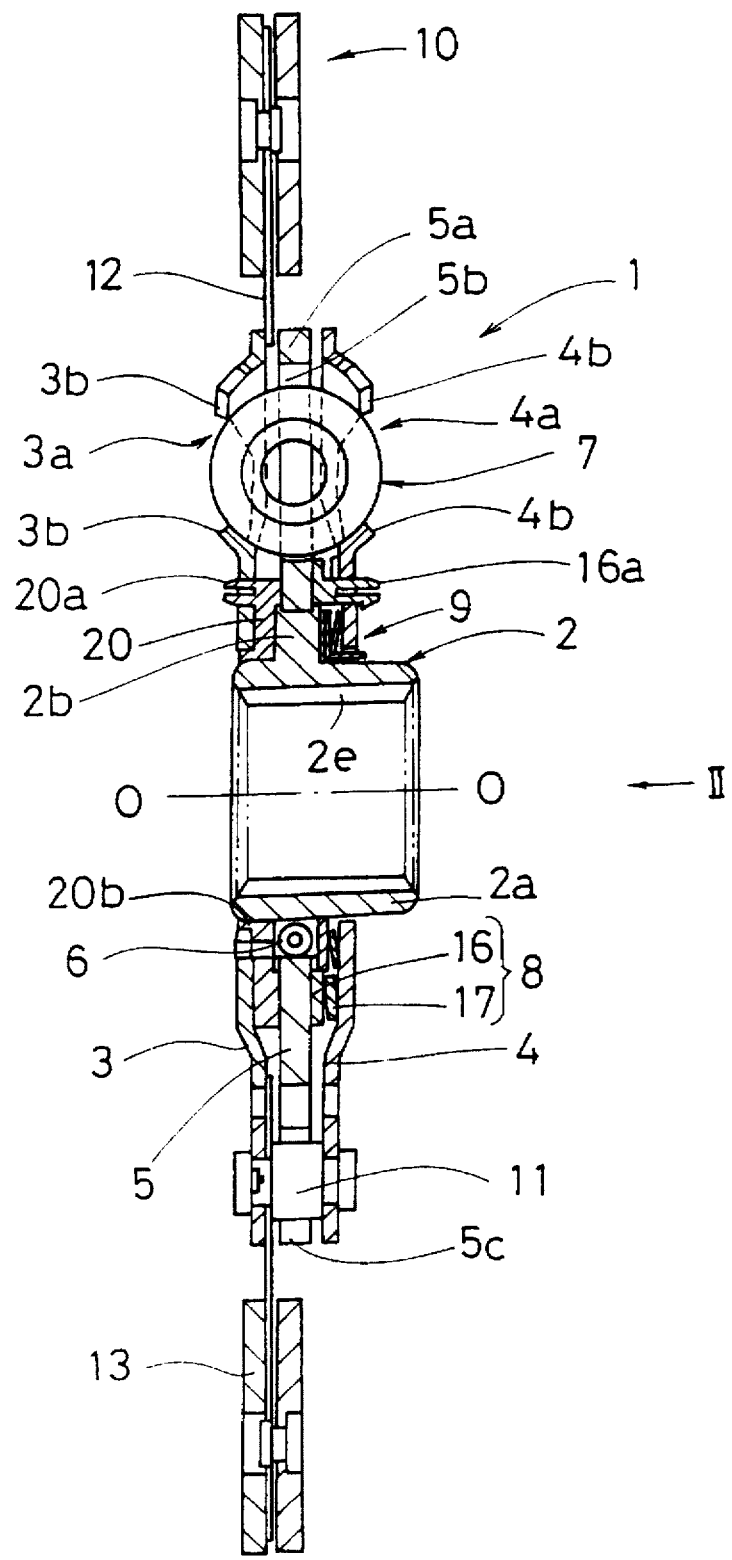
FIG. 1 is a side schematic, sectional view showing a clutch disc assembly in accordance with one embodiment of the present invention.

The present invention will now be described with reference to the accompanying drawings where like reference numerals are used throughout the specification to represent the various portions of the invention.

FIG. 1 shows a clutch disc assembly 1 according to a first embodiment of the invention. The assembly 1 is used for selectively transmitting a torque from an engine (not shown) disposed on the left in FIG. 1 to an transmission (not shown) disposed on the right in FIG. 1. In FIG. 1, line O—O designates a rotary axis of the clutch disc assembly 1.

The clutch disc assembly 1 included a hub 2 which serves as an output member. The clutch disc assembly 1 also includes a clutch plate 3 and a retaining plate 4 both serving as an input member, and a sub-plate 5 serving as an intermediate member. A plurality of small coil springs 6 are interposed between the sub-plate 5 and the hub 2 for limiting a relative rotation therebetween, large coil springs 7 interposed between the plates 3 and 4 and the sub-plate 5 for limiting a relative rotation therebetween. A first friction generating mechanism 8 and a second friction generating mechanism 9 for generating a predetermined friction when a relative rotation is generated between the plates 3 and 4 and the hub 2.

The hub 2 is disposed along a centerline of the clutch disc assembly 1 and is couplable with a shaft (not shown) of the transmission. The hub 2 is composed of a cylindrical boss 2a extending in the axial direction and a flange 2b formed integrally with an outer circumference of the boss 2a. Cutaways 2c (see FIG. 3A) are formed at two diametrically opposite positions for receiving both ends, in the circumferential direction, of the small coil springs 6 shown in FIG. 1. A spline hole 2e is formed at the central portion of the boss 2a to be spline engaged with the shaft (not shown) of the transmission.

Figure 2:
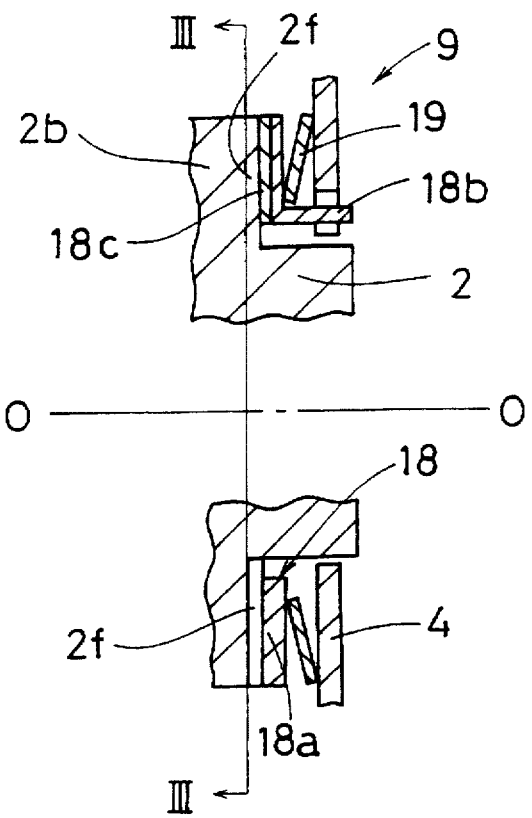
FIG. 2 is a fragmentary, side schematic sectional view of a portion of FIG. 1, on a slightly enlarged scale, showing a friction generating mechanism having a friction disk formed with high friction coefficient portions and a hub formed with projections, in accordance with the present invention.
Figure 3A:
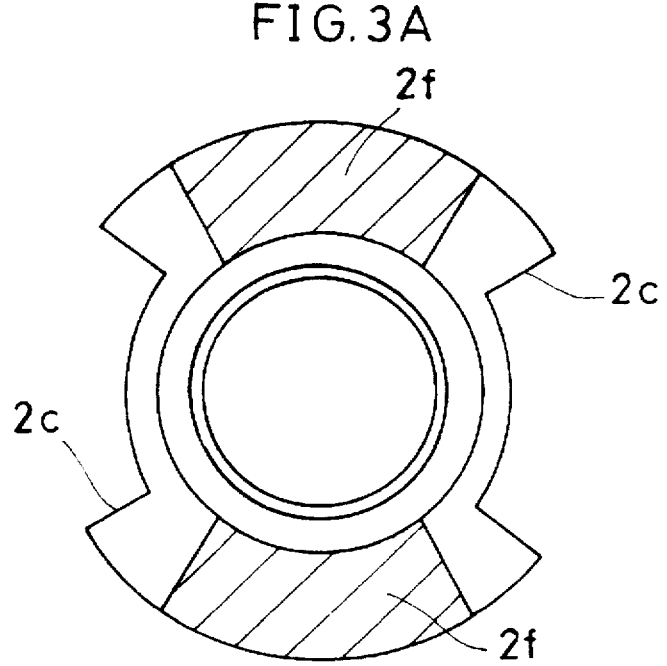
FIG. 3A is a sectional view taken along the line III—III in FIG. 2, looking in the direction of the arrows, showing the projections on the hub with other portions not shown to provide greater clarity.
Figure 3B:
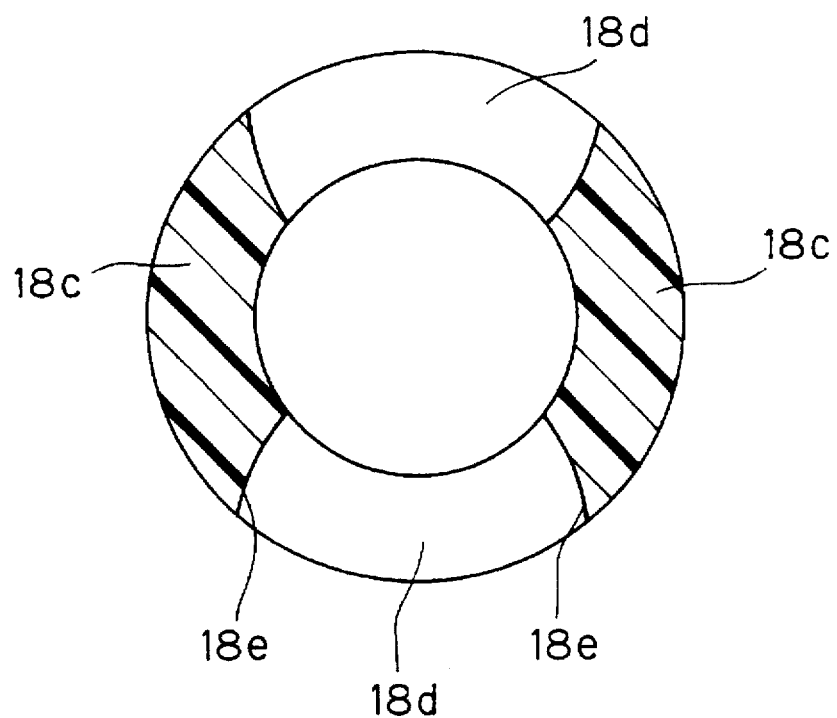
FIG. 3B is an end view of the friction disc shown removed from the clutch disc assembly depicted in FIGS. 1 and 2, showing the high friction coefficient portions.
Figure 3C:
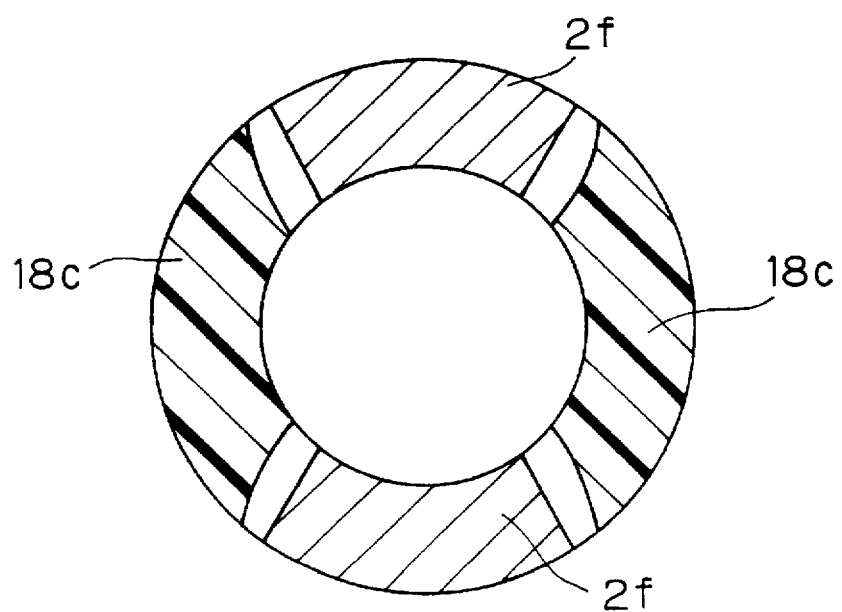
FIG. 3C is a superimposed view of the projections on the hub and the high friction coefficient portions of the friction disc, shown in their relative positions with the clutch disc assembly in a torsion free state.

As is shown in FIGS. 2, 3A and 3C, two projections 2f extending toward the transmission are formed on the outer circumference of the flange 2b of the hub 2. As shown in FIGS. 3A and 3C, the projections 2f are formed in an arcuate shape at diametrically opposite positions on the hub 2.

The sub-plate 5 is disposed on the outer circumference of the flange 2b of the hub 2. The sub-plate 5 may be made of a disc-shaped plate. The sub-plate 5 has four projections 5a extending radially outwardly. Window holes 5b extending in the circumferential direction are formed in the respective projections 5a. An outer cutaway 5c is formed between the each adjacent projections 5a. The inner circumferential side of the sub-plate 5 is rotatable through a predetermined angle in the circumferential direction relative to the outer circumference of the flange 2b of the hub 2. Inner cutaways (not shown) are formed at two positions corresponding to the cutaways 2c of the hub 2 on the inner circumferential side of the sub-plate 5. The small coil springs 6 are disposed within these cutaways. The clutch plate 3 and retaining plate 4 which serve as the input member are disposed on both sides of the sub-plate 5. The clutch plate 3 and the retaining plate 4 are generally a pair of disc members having central holes and fitted around the outer circumference of the boss 2a of the hub 2 to be rotatable thereto. The clutch plate 3 and the retaining plate 4 are fixed to each other at the outer circumferential portions by stopper pins 11. The stopper pins 11 extend through the outer cutaways 5a formed in the sub-plates 5. Since a predetermined gap is kept in the circumferential direction between the stopper pins 11 and the outer cutaways 5a, the plates 3, 4 and the sub-plate 5 are rotatable relative to each other within the predetermined angular range.

A frictional coupling portion 10 is arranged at the outer circumference of the clutch disc 3. The frictional coupling portion 10 is mainly composed of an annular cushioning plate 12 and frictional facings 13. The cushioning plate 12 is fixed to the clutch plate 3 by the stopper pins 11. The frictional facings 13 are fixed to both sides of the clutch plate 3. A flywheel (not shown) on the engine side is disposed on the left side (FIG. 1) of the frictional facings 13.

Referring again to FIG. 1, window holes 3a and 4a are formed in the clutch plate 3 and the retaining plate 4, respectively, corresponding to the window holes 5b of the sub-plate 5. The large coil springs 7 are disposed within the window holes 5b, 3a and 4a. Both ends of each of the large coil springs 7 are in contact with both ends of the associated window holes 5b, 3a and 4a. Retainer portions 3b and 4b which are cut axially outwardly are formed on both sides, in the radial direction, of each window hole 3a, 4a for limiting the axial movement and the radially outward movement of the large coil spring 7.

The first friction generating mechanism 8 includes a first friction washer 16 and a first conical spring 17 interposed between one radially extending side of the sub-plate 5 and the retaining plate 4. The first friction washer 16 is in contact with one radially extending side surface of the sub-plate 5. The first conical spring 17 is compressed and arranged between the first friction washer 16 and the retaining plate 4. Thus, the first conical spring 17 biases the first friction washer 16 toward the sub-plate 5 and biases the retaining plate 4 on the transmission side. Incidentally, the first friction washer 16 is engaged with the retaining plate 4 to rotate therewith due to engagement between the retaining plate 4 and a plurality of projections 16a formed on the first friction washer 16.

As is apparent from FIG. 2, the second friction generating mechanism 9 includes a second friction washer 18 and a second conical spring 19 between the flange 2b of the hub 2 and the inner circumferential portion of the retaining plate 4. The second friction washer 18 is composed of a disc portion 18a, and a plurality of projections 18b extending from the inner circumferential portion of the disc portion 18a toward the retaining plate 4. High friction coefficient members 18c which are at two diametrically opposite positions to each other are fitted on a surface, confronting the flange 2b, of the disc portion 18a. Each high friction coefficient member 18c extends through a predetermined arcuate distance in the circumferential direction as best shown in FIGS. 3 and 6. Each end of the high friction coefficient members 18c are tapered such that they become gradually narrow toward their ends. The projections 18b extend through apertures formed in an inner circumferential portion of the retaining plate 4 such that they are engaged with the retaining plate 4. The projection 18b cause the second friction washer 18 to rotate with the retaining plate 4, but the projections 18b allow the second friction washer 18 to move in the axial direction with respect to the retaining plate 4.

In FIGS. 3B and 3C, the second friction washer 18 is shown removed from the clutch disc assembly 1. The high friction coefficient members 18c are arcuate in shape with tapered ends 18e. A pair of generally flat surfaces 18d are defined between the two high friction coefficient members 18c. The flat surfaces 18d each define a first friction surface and the high friction coefficient members 18c define a second friction surface on the second friction washer 18. In FIG. 3c, the shape of the projections 2f formed on the hub 2 are shown with the high friction coefficient members 18c as they would be oriented with respect to one another with the clutch disc assembly 1 in a torsion free state. As can be seen by the shape of the tapered ends 18e and the shape and profile of the projections 2f, when relative rotation occurs between the hub 2 and the friction washer 18, there is gradually increasing surface area contact between the tapered ends 18e and the projections 2f resulting in a gradual increase in the amount of friction produced.

The high friction coefficient members 18c are formed of any of a variety of high friction materials. However, in the preferred embodiment, the high friction coefficient members 18c are formed from fiberglass and resin materials.

The second conical spring 19 is disposed in a compressed condition between the disc portion 18a of the second friction washer 18 and the inner circumferential portion of the retaining plate 4. Thus, the second conical spring 19 biases the disc portion 18a toward the flange 2b and biases the retaining plate 4 on the transmission side.

A third friction washer 20 is disposed in a space in the axial direction between the inner circumferential portion of the clutch plate 3 and the flange 2b of the hub 2/the inner circumferential ends of the sub-plate 5. The side surface, on the transmission side, of third friction washer 20 is in contact with a side surface of the inner circumferential edge portion of the sub-plate 5 and the side surface of the flange 2b. A snap projection 20a extending in the axial direction toward the engine is formed on the circumferential portion of the third friction washer 20. The snap projection 20a is engaged with a hole formed in the clutch plate 3. An annular projection 20b extending in the axial direction on the engine side is formed in the inner circumferential portion of the third friction washer 20. The inner circumferential edge of the clutch plate 3 is engaged with the outer circumferential side of the annular projection 20b so as not to rotate relative to each other.

The operation of the clutch disc assembly 1 will now be described.

When the friction facings 13 are pressed against the flywheel (not shown) on the engine side, a torque of the flywheel on the engine side is fed to the clutch plate 3 and the retaining plate 4. The torque is transmitted through the large coil springs 7, the sub-plate 5 and the small coil springs 6 to the hub 2 and is further outputted to the shaft (not shown) on the transmission side.

When a twist vibration having a small shift angle is transmitted from the flywheel (not shown) on the engine side to the clutch disc assembly 1, a relative rotation is generated between the plates 3 and 4 and the sub-plate 5 and the hub 2. At this time, the small coil springs 6 are compressed in the circumferential direction so that the second friction washer 18 slides relative to the projections 2f of the flange 2b of the hub 2. At this time, the twist vibration having a small shift angle is effectively attenuated by the characteristics of low rigidity/small friction.

When a twist vibration having a large shift angle is transmitted to the clutch disc assembly, the small coil springs 6 are compressed and the sub-plate 5 and the hub 2 are rotated together so that a relative rotation is generated between these members and the plates 3 and 4. At this time, the large coil springs 7 are compressed so that the friction washer 16 slides against the inner side surface of the sub-plate 5. Here, since the biasing force of the first conical spring 17 is larger than the biasing force of the second conical spring 19 and furthermore the frictional coefficient of the first friction washer 16 is set to be larger than the frictional coefficient of the second friction washer 18, the large friction is generated. At this time, the twist vibration having a large shift angle is effectively attenuated by the characteristics of high rigidity/large friction.

As described above, since suitable characteristics may be insured in response to a kind of the twist vibration, the clutch disc assembly 1 may effectively attenuate the twist vibrations.

Figure 4:
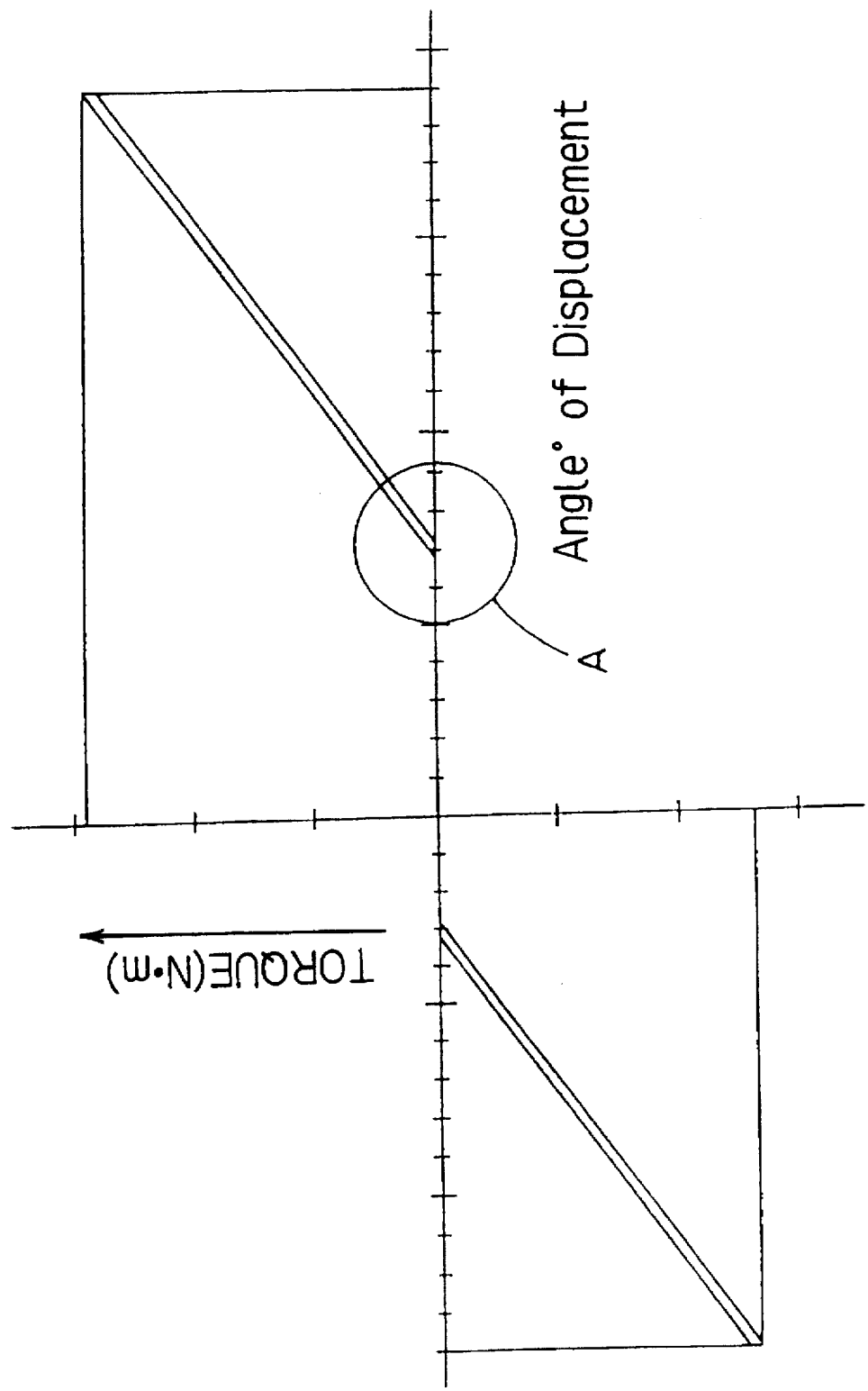
FIG. 4 is a graph showing response characteristics of the clutch disc assembly depicted in FIGS. 1–3.
Figure 5:
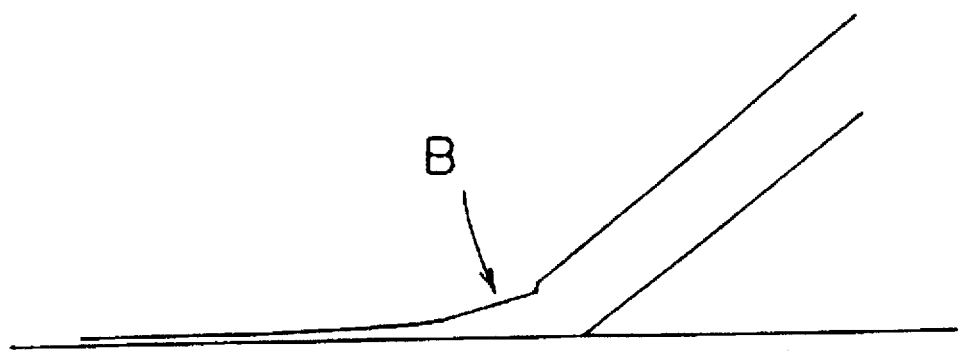
FIG. 5 is an enlarged view showing an encircled part A of FIG. 4.

The twist characteristics of the clutch disc assembly 1 will now be explained with reference to the graphs shown in FIGS. 4 and 5. To plot the dots for the graphs, the clutch plate 3 and the retaining plate 4 were fixed to another device not rotatable and the hub 2 was rotated relative to the plates 3 and 4. In FIG. 5 corresponding to an encircled part A in FIG. 4, a portion B having the intermediate characteristics is formed between the first stage characteristics and the second stage characteristics. The reason for this is that in the first stage characteristics, the projections 2f slide only along the low friction coefficient portions of the disc portion 18a in the range of the small twist angle, and slide toward the high frictional coefficient members 18c as the twist angle is increased. Namely, as the contact area between the projections 2f and the high friction coefficient members 18c is increased, the friction coefficient between the projections 2f and the second friction washer 18 is increased. As a result, the friction therebetween is gradually increased. In particularly, since the width of both end portions, in the circumferential direction, of the high friction coefficient members 18 is gradually narrowed, the change of characteristics becomes gentle. Thus, since the first stage characteristics are gently changed to the second stage characteristics, even if the twist vibration falling within the range including this change point is applied, the shock is hardly generated.

It is understood that the friction generating mechanism according to the invention is not limited to the above-described specific embodiment.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What we claimed:

1. A friction generating mechanism for a damper disc assembly comprising:

a first rotary member;

a second rotary member disposed adjacent to said first rotary member being rotatable relative to said first rotary member, said second rotary member having at least one arcuate projection extending toward said first rotary member, said arcuate projection extending a predetermined angle in a circumferential direction on said second rotary member;

an annular friction member disposed between said first and second rotary members, said annular friction member coupled to said first rotary member in the circumferential direction for rotation therewith, said annular friction member formed with a first friction surface which contacts said projections with said first and second rotary members in a torsion free state, said annular friction member also formed with a second friction surface disposed on said second rotary member extending a predetermined angle in a circumferential direction on said second rotary member, said second friction surface being engagable with said projections in response to torsion vibration being applied to said first and second rotary members, said second friction surface having a frictional coefficient higher than said first friction surface; and biasing members for biasing said annular friction member toward said second rotary member.

2. The friction generating mechanism according to claim 1, wherein two of said first friction surfaces are formed on a single side of said annular friction member and two of said projections are formed on said second rotary member.

3. The friction generating mechanism according to claim 1, wherein said second friction surface is formed on a surface of said annular friction member and is formed from fiberglass and resin materials.

4. The friction generating mechanism according to claim 1, wherein a plurality of first friction surfaces and a plurality of second friction surfaces are alternately formed in the circumferential direction.

5. The friction generating mechanism according to claim 1, wherein a leading edge of each end of said second friction surface gradually narrows proximate said first friction surface.

6. The friction generating mechanism according to claim 1, further comprises:

a sub-plate disposed concentrically and radially outward from said second rotary member, said sub-plate and said second rotary member elastically coupled together by at least one spring member restricting said sub-plate and said second rotary member to limited relative rotary displacement.

7. The friction generating mechanism according to claim 6, further comprising a second annular friction member disposed between said first rotary member and said sub-plate at a position radially outward from said first annular friction member.

8. The friction generating mechanism according to claim 7, further comprising:

a third rotary member disposed adjacent to said second rotary member such that said first and third rotary members are on opposite sides of said second rotary member and opposite sides of said sub-plate; and a third annular friction member disposed between said sub-plate and said third rotary member.

9. The friction generating mechanism according to claim 8, further comprising a clutch disc friction member connected to said third rotary member.

10. The friction generating mechanism according to claim 8, further comprising at least one coil spring elastically coupling said sub-plate and said first and third rotary members together restricting said sub-plate to limited relative rotary displacement with respect to said first and third rotary members.

11. A friction generating mechanism for a damper disc assembly comprising:

a first rotary member;

a second rotary member disposed adjacent to said first rotary member being rotatable relative to said first rotary member, said second rotary member having at least one arcuate projection extending toward said first rotary member, said arcuate projection extending a predetermined angle in a circumferential direction on said second rotary member, said second rotary member including a central aperture formed with spline gears;

an annular friction member disposed between said first and second rotary members, said annular friction member coupled to said first rotary member in the circumferential direction for rotation therewith, said annular friction member formed with a first friction surface which contacts said projections with said first and second rotary members in a torsion free state, said annular friction member also formed with a second friction surface disposed on said second rotary member extending a predetermined angle in a circumferential direction on said second rotary member, said second friction surface being engagable with said projections in response to torsion vibration being applied to said first and second rotary members, said second friction surface having a frictional coefficient higher than said first friction surface;

biasing members for biasing said annular friction member toward said second rotary member;

a sub-plate disposed concentrically and radially outward from said second rotary member, said sub-plate and said second rotary member elastically coupled together by at least one spring member restricting said sub-plate and said second rotary member to limited relative rotary displacement.

12. The friction generating mechanism according to claim 11, wherein two of said first friction surfaces are formed on a single side of said annular friction member and two of said projections are formed on said second rotary member.

13. The friction generating mechanism according to claim 11, wherein said second friction surface is formed on a surface of said annular friction member and is formed from fiberglass and resin materials.

14. The friction generating mechanism according to claim 11, wherein a plurality of first friction surfaces and a plurality of second friction surfaces are alternately formed in the circumferential direction.

15. The friction generating mechanism according to claim 11, wherein a leading edge of each end of said second friction surface gradually narrows proximate said first friction surface.

16. The friction generating mechanism according to claim 11, further comprising a second annular friction member disposed between said first rotary member and said sub-plate at a position radially outward from said first annular friction member.

17. The friction generating mechanism according to claim 16, further comprising:

a third rotary member disposed adjacent to said second rotary member such that said first and third rotary members are on opposite sides of said second rotary member and opposite sides of said sub-plate; and a third annular friction member disposed between said sub-plate and said third rotary member.

18. The friction generating mechanism according to claim 17, further comprising a clutch disc friction member connected to said third rotary member.

19. The friction generating mechanism according to claim 17, further comprising at least one coil spring elastically coupling said sub-plate and said first and third rotary members together restricting said sub-plate to limited relative rotary displacement with respect to said first and third rotary members.

* * * * *